United States Patent
Furo et al.

(10) Patent No.: US 11,898,090 B2
(45) Date of Patent: Feb. 13, 2024

(54) DIVERTING AGENT AND METHOD OF FILLING FRACTURE IN WELL USING THE SAME

(71) Applicant: Mitsubishi Chemical Corporation, Tokyo (JP)

(72) Inventors: Chizuko Furo, Tokyo (JP); Yuya Kanamori, Tokyo (JP); Yasuhiro Hirano, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/563,637

(22) Filed: Dec. 28, 2021

(65) Prior Publication Data
US 2022/0119697 A1 Apr. 21, 2022

Related U.S. Application Data

(63) Continuation of application No. PCT/JP2020/026300, filed on Jul. 3, 2020.

(30) Foreign Application Priority Data

Jul. 3, 2019 (JP) .................................. 2019-124756

(51) Int. Cl.
*C09K 8/508* (2006.01)
*E21B 43/26* (2006.01)

(52) U.S. Cl.
CPC ............ *C09K 8/5083* (2013.01); *E21B 43/26* (2013.01)

(58) Field of Classification Search
CPC ........ C09K 8/508; C09K 8/5083; C09K 8/88; C09K 8/68; C09K 8/80; C09K 8/516; C09K 8/70
See application file for complete search history.

(56) References Cited

U.S. PATENT DOCUMENTS

| | | | |
|---|---|---|---|
| 8,905,133 | B2 | 12/2014 | Potapenko et al. |
| 2004/0192829 | A1 | 9/2004 | Soda et al. |
| 2016/0145483 | A1 | 5/2016 | Lecerf et al. |
| 2016/0298017 | A1 | 10/2016 | Takahashi et al. |
| 2017/0198191 | A1* | 7/2017 | Potapenko ............ E21B 33/138 |
| 2017/0253703 | A1 | 9/2017 | Yoshikawa et al. |
| 2018/0010037 | A1 | 1/2018 | Yoshikawa et al. |
| 2019/0002691 | A1 | 1/2019 | Ogawa et al. |
| 2019/0153290 | A1 | 5/2019 | Katou et al. |
| 2020/0172796 | A1 | 6/2020 | Tsuji et al. |
| 2020/0317985 | A1* | 10/2020 | Fujita .................... C09K 8/508 |

FOREIGN PATENT DOCUMENTS

| | | |
|---|---|---|
| CN | 1537146 A | 10/2004 |
| CN | 102052060 A | 5/2011 |
| CN | 105441043 A | 3/2016 |
| CN | 105441047 A | 3/2016 |
| CN | 107208474 A | 9/2017 |
| CN | 108291029 A | 7/2018 |
| JP | 2016-056272 | 4/2016 |
| JP | 2016-147971 | 8/2016 |
| JP | 2016-147972 | 8/2016 |
| WO | 2015-072317 | 5/2015 |
| WO | 2018/026375 | 2/2018 |
| WO | 2018-094123 A1 | 5/2018 |
| WO | 2018/231236 | 12/2018 |
| WO | 2019/031613 | 2/2019 |
| WO | 2019/131939 | 7/2019 |

OTHER PUBLICATIONS

Extended European Search Report issued in EP Patent Application No. 20834788.0, dated Jul. 15, 2022.
ISR issued in International Patent Application No. PCT/JP2020/026300, dated Sep. 8, 2020, translation.
IPRP/Writtent Opinion issued in International Patent App. No. PCT/JP2020/026300, dated Dec. 28, 2021, translation.
Office Action issued in Chinese Patent Application No. 202080047197.8, dated Oct. 8, 2022, translation.
Qin et al., "Optimized Design of Temporary Plugging Agent for Shale Gas Hydraulic Fracturing" *Guangzhou Chemical Industry*, vol. 47, No. 6, Mar. 2019, pp. 109-112, translation.
Zhang et al., "New Theory and Method for Optimizing Particle Size Distribution of Bridging Agents in Completion fluids" *ACTA PETROLEI SINICA*, vol. 25, No. 6, Nov. 2004, pp. 88-91, translation.
Office Action issued in the corresponding Chinese Patent Application No. 202080047197.8 dated Mar. 7, 2023, along with English translation.
Office Action that issued in corresponding Chinese Patent Application No. 202080047197.8 dated Nov. 13, 2023, along with English translation thereof.

* cited by examiner

*Primary Examiner* — Zakiya W Bates
(74) *Attorney, Agent, or Firm* — GREENBLUM & BERNSTEIN, P.L.C.

(57) ABSTRACT

A diverting agent which has performance to release filling due to biodegradability, can be quickly removed after a certain period of time, and has an excellent filling property with respect to a fracture in a well is provided. The diverting agent contains particles having a particle diameter of 1,700 μm or more in an amount of 10 to 70 mass %, particles having a particle diameter of 500 μm or more and less than 1,700 μm in an amount of 20 to 80 mass %, and particles having a particle diameter of less than 250 μm in an amount of 5 to 40 mass %, and the diverting agent contains a biodegradable resin in an amount of 10 mass % or more.

6 Claims, No Drawings

DIVERTING AGENT AND METHOD OF FILLING FRACTURE IN WELL USING THE SAME

CLAIM FOR PRIORITY

This application is a Continuation of PCT/JP2020/026300 filed Jul. 3, 2020, and claims the priority benefit of Japanese application 2019-124756 filed Jul. 3, 2019, the contents of which are expressly incorporated by reference herein in their entireties.

TECHNICAL FIELD

The present invention relates to a diverting agent and a method of filling a fracture in a well using the diverting agent. More specifically, the present invention relates to a diverting agent to be used during construction of excavation method using a hydraulic fracturing method and a method of filling a fracture in a well using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, first, a vertical hole (vertical well) with a depth of several thousand meters below ground is excavated vertically by a drill, and then, when the vertical hole reaches the shale layer, a horizontal hole (horizontal well) with a diameter of ten to several tens of centimeters is excavated horizontally. By filling the vertical well and the horizontal well with fluid and pressurizing the fluid, fractures are generated from the well. Natural gas, petroleum (shale gas/oil) or the like in the shale layer flows out from the fractures and is collected. According to such a method, a resource inflow cross-section of wells can be increased by generation of fractures, and underground resources can be efficiently collected.

In the hydraulic fracturing method described above, prior to generation of fractures by fluid pressurization, preliminary blasting called perforation is performed in a horizontal well. By such preliminary blasting, borings are made from the well to a production layer. After that, by injecting the fracturing fluid into the well, the fluid flows into these borings, and a load is applied to the borings. Then, fractures are generated in these borings and grow into fractures in a size suitable for resource collection.

In the hydraulic fracturing method, a part of fractures that has already been generated is temporarily filled with an additive called a diverting agent in order to grow fractures that have already been generated larger or to generate more fractures. By temporarily filling a part of the fractures with the diverting agent and pressurizing the fracturing fluid filled in the well in the state, fluid may enter into the other fractures, so that other fractures can grow larger or new fractures can be generated.

Since the diverting agent is used to temporarily fill the fractures as described above, a diverting agent which can maintain the shape for a certain period of time and disappears by hydrolysis when natural gas, petroleum or the like is collected is used. For example, various techniques in which a hydrolyzable resin such as polyglycolic acid or polylactic acid is used as a diverting agent have been proposed.

Patent Literature 1 has proposed a temporary sealing agent for use in well boring which contains polyglycolic acid having high biodegradability among biodegradable aliphatic polyester-based resins.

Patent Literature 2 has proposed a powder containing particles of polylactic acid which is a biodegradable resin in which 50 mass % or more of particles do not pass through a sieve having an opening of 500 μm and in which the particles have an angle of repose of 51 degrees or more.

Further, Patent Literature 3 has proposed hydrolyzable particles having a dispersion structure in which fine particles of a polyoxalate having a high biodegradability for adjusting the degree of hydrolysis of the polylactic acid are distributed in polylactic acid and having an average particle diameter ($D_{50}$) of 300 to 1,000 μm and a roundness in which a minor axis/major axis ratio is 0.8 or more.

Furthermore, Patent Literature 4 has proposed polyoxalate particles having an average particle diameter ($D_{50}$) in the range of 300 to 1,000 μm and a roundness in which a minor axis/major axis ratio is 0.8 or more.

In addition, as a new use of a polyvinyl alcohol-based resin which is a water-soluble and biodegradable resin, the present applicant has developed and proposed a diverting agent containing the polyvinyl alcohol-based resin (see, for example, Patent Literature 5).

CITATION LIST

Patent Literature

Patent Literature 1: WO2015/072317
Patent Literature 2: JP-A-2016-056272
Patent Literature 3: JP-A-2016-147971
Patent Literature 4: JP-A-2016-147972
Patent Literature 5: WO2019/031613

SUMMARY OF INVENTION

Technical Problem

In order to grow a large fracture or generate a new fracture by a hydraulic fracturing method, it is necessary to fill an already generated fracture without a gap, and further improvement of a diverting agent having high filling property of the fracture is required.

The present invention has been made to solve the above problems. An object of the present invention is to provide a diverting agent that has solubility in water, can be quickly removed after a certain period of time, and is excellent in filling property against a fracture in a well.

Solution to Problem

The present inventors have made intensive studies and have found, as a result, that the above problems can be solved by a diverting agent having a specific particle diameter distribution and containing a biodegradable resin in a specific amount or more.

That is, the present invention is characterized by the following (1) to (6).

(1) A diverting agent, containing: particles having a particle diameter of 1,700 μm or more in amount of 10 to 70 mass %, particles having a particle diameter of 500 μm or more and less than 1,700 μm in an amount of 20 to 80 mass %, and particles having a particle diameter of less than 250 μm in an amount of 5 to 40 mass %, in which the diverting agent contains a biodegradable resin in an amount of 10 mass % or more.

(2) The diverting agent according to (1), in which when 24 g of the diverting agent is added to 400 mL of a 0.60 mass % aqueous solution of guar gum and dispersed at 23° C. for 60 minutes to obtain a dispersion liquid having a diverting agent concentration of 6 mass %, the dispersion liquid is subjected to pressure dehydration at pressure of 0.4 MPa using a pressure dehydration device including a drainage portion having a slit having a width of 2 mm, a cumulative dehydration amount y with respect to a square root x of a time is obtained, and a regression line represented by the following formula (A) is calculated by a least-squares method from a scatter diagram plotted on a graph in which the square root x of the time is plotted on a horizontal axis and the cumulative dehydration amount y is plotted on a vertical axis, a water permeability coefficient represented by a slope a of the following formula (A) is in a range of 0.0 to 4.0, $$y=ax+b \quad (A)$$

in the formula (A), y is a cumulative dehydration amount (g), x is the square root of the time (minutes) elapsed from start of pressurization, a and b are the slope and an intercept of the regression line, and $0<x\leq 2$.

(3) The diverting agent according to (1) or (2), in which the biodegradable resin contains a polyvinyl alcohol-based resin.

(4) The diverting agent according to (3), in which the polyvinyl alcohol-based resin has a degree of saponification of 90 mol % or more.

(5) The diverting agent according to (3) or (4), in which the polyvinyl alcohol-based resin is a polyvinyl alcohol-based resin having a primary hydroxyl group in a side chain.

(6) A method of temporarily filling a fracture generated in a well, the method containing: allowing the diverting agent according to any one of (1) to (5) to flow into a fracture to be filled with a flow of a fluid in the well.

Advantageous Effects of Invention

The diverting agent according to the present invention contains a biodegradable resin particles in an specific amount or more and has a specific particle diameter distribution. Therefore, the diverting agent is excellent in filling property to a target gap, and can be suitably used for a hydraulic fracturing method employed in excavation operation of natural gas, petroleum, or the like.

DESCRIPTION OF EMBODIMENTS

Hereinafter, the present invention will be explained in detail, but the following explanations only show an example of preferred embodiments, the present invention is not limited thereto.

A term "polyvinyl alcohol" may be simply referred to as "PVA".

Further, in the present description, "mass" has the same meaning as "weight".

In the present description, (meth)allyl means allyl or methallyl, (meth)acryl means acryl or methacryl, and (meth)acrylate means acrylate or methacrylate.

A diverting agent according to the present invention is a particle mixture containing 10 to 70 mass % of particles having a particle diameter of 1,700 μm or more, 20 to 80 mass % of particles having a particle diameter of 500 μm or more and less than 1,700 μm, and 5 to 40 mass % of particles having a particle diameter of less than 250 μm, and 10 mass % or more of the whole is a biodegradable resin.

A shape of the particles used in the present invention is not particularly limited, and examples thereof include a spherical shape, a powdery shape, an ellipse shape, a cylindrical shape (pellet), a plate shape, a cubic shape, a rectangular shape, a prismatic shape, and a polygonal shape. From a viewpoint of further enhancing an effect of the present invention, it is preferable to use particles having different shapes in combination. For example, it is preferable to use a mixture in which cylindrical particles and powder are combined.

When cylindrical (pellet) particles are used, for an average particle diameter of the particles, a diameter of the cross section orthogonal to an axial direction is preferably 500 μm to 5.0 mm, more preferably 1.0 mm to 4.0 mm, and still more preferably 1.85 mm to 3.0 mm, and a thickness (length in the axial direction) is preferably 500 μm to 5.0 mm, more preferably 1.0 mm to 4.0 mm, and still more preferably 1.85 mm to 3.0 mm.

When spherical particles are used, the particles are preferably in the form of powder, and the average particle diameter thereof is 10 μm to 2,000 μm, preferably 100 μm to 1,500 μm.

The mass and the average particle diameter in each particle diameter range can be measured by a dry sieving test method (refer to JIS Z 8815: 1994). In the present description, the particle diameter is a diameter at which the integrated value (cumulative distribution) is 50% when a particle diameter-based volume distribution is measured by the dry sieving test method.

When the particle diameter of the diverting agent is measured, in the case where the particles are made non-uniform in a packaging bag or the like, measurement samples are collected from different 10 or more places in the packaging bag, the particle diameters of the measurement samples are obtained, and the obtained measurement values are averaged.

Examples of kind of particles include biodegradable resins such as polyvinyl alcohol-based resins (hereinafter, also referred to as a PVA-based resin), polyglycolic acid-based resins, polylactic acid-based resins, and other aliphatic polyester-based resins; inorganic minerals such as sand, calcium carbonate, mica, silica, alumina, quartz, and feldspar; and metals such as iron.

In the present invention, when the diverting agent is divided into particles having a particle diameter of 1,700 μm or more, particles having a particle diameter of 500 μm or more and less than 1,700 μm, particles having a particle diameter of 250 μm or more and less than 500 μm, and particles having a particle diameter of less than 250 μm, particles having a particle diameter of 1,700 μm or more (hereinafter, also referred to as a particle group A) are contained in a range of 10 to 70 mass %, particles having a particle diameter of 500 μm or more and less than 1,700 μm (hereinafter, also referred to as a particle group B) are contained in a range of 20 to 80 mass %, and particles having a particle diameter of less than 250 μm (hereinafter, also referred to as a particle group C) are contained in a range of 5 to 40 mass %.

When a content of the particle group A is 10 to 70 mass %, the content of the particle group B is 20 to 80 mass %, and the content of the particle group C is 5 to 40 mass %, the particle group A having a large particle diameter forms a bridge in a target gap, the particle group B is clogged in the gap reduced by formation of the bridge, and the particle group C having a small particle diameter fills the further reduced gap, so that excellent filling property can be exhibited. In the particle mixture, the content of the particle group A is preferably 20 to 50 mass %, the content of the particle group B is preferably 25 to 60 mass %, and the content of the particle group C is preferably 10 to 30 mass %.

The diverting agent according to the present invention contains 10 mass % or more of the biodegradable resin, and the content thereof is more preferably 20 mass % or more, still more preferably 30 mass % or more, and particularly preferably 50 mass % or more. Accordingly, the target gap is filled, and after a certain period of time elapses, a filling state is lost, and the fluid can flow again.

As such a biodegradable resin, those exemplified above can be used, and a biodegradable resin whose decomposition rate is appropriately adjusted in accordance with environment to be used, for example, a temperature condition may be selected.

In particular, when filling under a low temperature condition (specifically, 40 to 60° C.) and filling release by decomposition are necessary, a PVA-based resin which is biodegradable and water-soluble is preferably used.

The PVA-based resin is a resin mainly having a vinyl alcohol structural unit obtained by saponifying a polyvinyl ester-based polymer obtained by polymerizing a vinyl ester-based monomer, and has a vinyl alcohol structural unit corresponding to the degree of saponification and a vinyl acetate structural unit of an unsaponified portion.

In the present invention, examples of the PVA-based resin include a modified PVA-based resin obtained by copolymerizing various monomers during production of a vinyl ester-based resin and saponifying the copolymer, and various post-modified PVA-based resins obtained by introducing various functional groups into an unmodified PVA-based resin by post-modification, in addition to an unmodified PVA-based resin. Such modification can be performed as long as the water solubility of the PVA-based resin is not lost. In some cases, the modified PVA-based resin may be further post-modified.

The degree of saponification (measured in accordance with JIS K 6726:1994) of the PVA-based resin is preferably 60 to 100 mol %. The degree of saponification is preferably 90 mol % or more, and more preferably 95 mol % or more. When the degree of saponification is too low, the water solubility tends to decrease. An upper limit is more preferably 99.8 mol % or less, and still more preferably 99.5 mol % or less.

An average polymerization degree of the PVA-based resin (measured in accordance with JIS K 6726: 1994) is preferably from 100 to 3,500, more preferably from 150 to 3000, still more preferably from 200 to 2,500, particularly preferably from 300 to 2,000. When the average polymerization degree is too large, the production tends to be difficult.

A melting point of the PVA-based resin is preferably 140 to 250° C., more preferably 150 to 245° C., still more preferably 160 to 240° C., and particularly preferably 170 to 230° C.

The melting point is a value measured with a differential scanning calorimeter (DSC) at a temperature rising/decreasing rate of 10° C./min.

As described above, the PVA-based resin is obtained, for example, by saponifying the polyvinyl ester-based polymer obtained by polymerizing the vinyl ester-based monomer.

Examples of the vinyl ester-based monomer include vinyl acetate, vinyl formate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl pivalate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

A saponified product of a copolymer of the vinyl ester-based monomer and a monomer copolymerizable with the vinyl ester monomer may also be used to such an extent that the effects of the present invention are not impaired. Examples of the copolymerizable monomer include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof; alkyl vinyl ethers; N-acrylamide methyltrimethylammonium chloride; allyl trimethylammonium chloride; dimethylallyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene [1-(meth)acrylamide-1,1-dimethylpropyl] ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxyl group-containing α-olefins such as 3-buten-1-ol, 4-penten-1-ol, and 5-hexen-1-ol, or derivatives such as an acylated product thereof.

Examples of the copolymerizable monomer used for copolymerization with the vinyl ester-based monomer include, in addition to the above, compounds having a diol such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinylethylene carbonate, and 2,2-dimethyl-4-vinyl-1,3-dioxolane.

The polymerization of the vinyl ester-based monomers can be performed by any known polymerization method such as solution polymerization, suspension polymerization, and emulsion polymerization. Among these, it is preferable to perform the solution polymerization which can remove reaction heat efficiently under reflux. As a solvent for the solution polymerization, alcohol is generally used, and lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Generally, the saponification is preferably performed by a transesterification reaction using an alkali catalyst in the presence of an anhydrous alcohol solvent in terms of reaction rate or reduction of impurities such as fatty acid salts.

The reaction temperature of the saponification reaction is generally 20 to 60° C. When the reaction temperature is too low, the reaction rate tends to decrease and reaction efficiency tends to decrease. When the reaction temperature is too high, the reaction temperature may exceed the boiling point of the reaction solvent, and safety in production tends to decrease. In a case of performing the saponification under high pressure using a tower-type continuous saponification tower with high pressure resistance, the saponification can be performed at a higher temperature, for example, 80 to 150° C., and a PVA-based resin having a high degree of saponification can be obtained in a short time even using a small amount of saponification catalyst.

The PVA-based resin forming the PVA-based resin particles used in the particle group A and the particle group B (hereinafter, referred to as the PVA-based resin of the particle group A and the particle group B) is preferably a PVA-based resin for melt forming in consideration of being molded into particles having various shapes.

Among these, as the PVA-based resin for melt forming, a modified PVA-based resin into which a functional group is introduced is preferable. Since the modified PVA-based resin has higher solubility in water than that of an unmodified resin, the modified PVA-based resin also has an advantage that the modified PVA-based resin is easily dissolved and removed after the target gap is filled. Examples of the modified PVA-based resin include a PVA-based resin having a primary hydroxyl group in a side chain and an ethylene-modified PVA-based resin. In particular, the PVA-based resin having the primary hydroxyl group in the side chain is preferable in terms of excellent melt moldability. The number of the primary hydroxyl group in the PVA-based resin having a primary hydroxyl group in the side chain is generally 1 to 5, preferably 1 to 2, and particularly preferably 1. In addition to the primary hydroxyl group, a secondary hydroxyl group is preferably contained.

Examples of such a PVA-based resin having the primary hydroxy group in the side chain include a modified PVA-based resin having a 1,2-diol structural unit in the side chain and a modified PVA-based resin having a hydroxyalkyl group structural unit in the side chain. Among these, it is particularly preferable to use the modified PVA-based resin having the 1,2-diol structural unit in the side chain (hereinafter, may be referred to as "side-chain 1,2-diol structural unit-containing modified PVA-based resin") represented by the following general formula (1).

The moiety other than the 1,2-diol structural unit is a vinyl alcohol structural unit and a vinyl ester structural unit in an unsaponified moiety, similar to a general PVA-based resin.

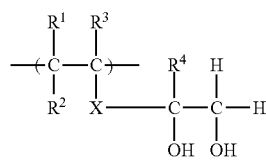

(1)

(In the formula (1), $R^1$ to $R^4$ each independently represent a hydrogen atom or an alkyl group having 1 to 4 carbon atoms, and X represents a single bond or a bond chain.)

In the above general formula (1), $R^1$ to $R^4$ each independently represent a hydrogen atom or an alkyl group having 1 to 4 carbon atoms. $R^1$ to $R^4$ are preferably all hydrogen atoms, however may be an alkyl group having 1 to 4 carbon atoms as long as resin properties are not remarkably impaired. The alkyl group is not particularly limited, and is preferably, for example, a methyl group, an ethyl group, an n-propyl group, an isopropyl group, an n-butyl group, an isobutyl group, and a tert-butyl group. The alkyl group may have a substituent such as a halogen group, a hydroxy group, an ester group, a carboxylic acid group, or a sulfonic acid group as needed.

In the above general formula (1), X is a single bond or a bond chain, preferably a single bond in terms of thermal stability and stability under high temperature and acidic conditions, but may be a bond chain as long as the effects of the present invention are not impaired.

Such a bond chain is not particularly limited, and examples thereof include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom or a bromine atom), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. Each R is independently a hydrogen atom or an optional substituent, and is preferably a hydrogen atom or an alkyl group (particularly an alkyl group having 1 to 4 carbon atoms). In addition, m is a natural number, and is preferably 1 to 10, particularly preferably 1 to 5. Among these, the bond chain is preferably an alkylene group having 6 or less carbon atoms, particularly a methylene group, or —CH$_2$OCH$_2$— in terms of viscosity stability and heat resistance during production.

In a particularly preferred structure of the 1,2-diol structural unit represented by the general formula (1), $R^1$ to $R^4$ are all hydrogen atoms, and X is a single bond.

A modification rate in the modified PVA-based resin, that is, the content of the structural unit derived from various monomers in the copolymer or the content of the functional group introduced by a post reaction cannot be said unconditionally because the characteristics vary greatly depending on the type of functional group, and is generally 0.1 to 20 mol %.

For example, when the PVA-based resin is a side-chain 1,2-diol structural unit-containing modified PVA-based resin, the modification rate is generally 0.1 to 20 mol %, preferably 0.5 to 10 mol %, more preferably 1 to 8 mol %, particularly preferably 1 to 3 mol %. When the modification rate is too high, the fracture cannot be temporarily filled. When the modification rate is too low, the solubility after a certain period of time may be deteriorated.

The content (modification rate) of the 1,2-diol structural unit in the PVA-based resin can be determined from a $^1$H-NMR spectrum (solvent: DMSO-d$_6$, internal standard: tetramethylsilane) of a PVA-based resin having a degree of saponification of 100 mol %. Specifically, the content can be calculated based on peak areas derived from a hydroxy proton, a methine proton, and a methylene proton in the 1,2-diol structural unit, a methylene proton in the main chain, a proton of a hydroxy group linked to the main chain, and the like.

When the PVA-based resin is an ethylene-modified PVA-based resin, the modification rate is generally 0.1 to 15 mol %, preferably 0.5 to 10 mol %, more preferably 1 to 10 mol %, particularly preferably 5 to 9 mol %. When the modification rate is too high, the water solubility tends to decrease. When the modification rate is too low, the melt forming tends to be difficult.

A bonding mode of the main chain of the PVA-based resin for use in the present invention is mainly 1,3-diol bonding, and the content of 1,2-diol bonding is about 1.5 mol % to 1.7 mol %. The content of the 1,2-diol bonding can be increased by increasing a polymerization temperature during polymerization of the vinyl ester-based monomers, and the content thereof can be increased to 1.8 mol % or more, and further to 2.0 to 3.5 mol %.

The side-chain 1,2-diol structural unit-containing modified PVA-based resin can be produced by a known production method. For example, the modified PVA-based resin can be produced by the methods described in JP-A-2002-284818, JP-A-2004-285143, and JP-A-2006-95825. That is, the modified PVA-based resin can be produced by (i) a method of saponifying a copolymer of a vinyl ester-based monomer and a compound represented by the following general formula (2), (ii) a method of saponifying and decarboxylation of a copolymer of a vinyl ester-based monomer and a vinylethylene carbonate represented by the following general formula (3), (iii) a method of saponifying and deketalizing a copolymer of a vinyl ester-based monomer and a 2,2-dialkyl-4-vinyl-1,3-dioxolane represented by the following general formula (4), or the like.

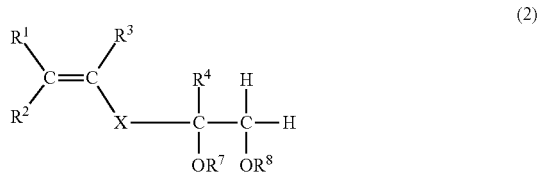

(In the formula (2), $R^1$ to $R^4$ each independently represent a hydrogen atom or an alkyl group having 1 to 4 carbon atoms, X represents a single bond or a bond chain, and $R^7$ and $R^8$ each independently represent a hydrogen atom or $R^9$—CO— (in the formula, $R^9$ is an alkyl group having 1 to 4 carbon atom).)

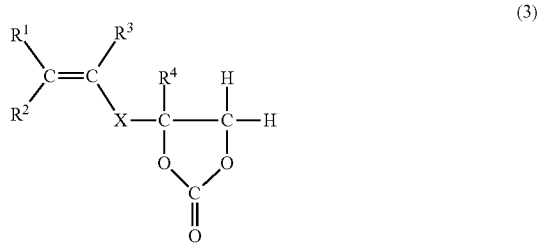

(In the formula (3), $R^1$ to $R^4$ each independently represent a hydrogen atom or an alkyl group having 1 to 4 carbon atoms, and X represents a single bond or a bond chain.)

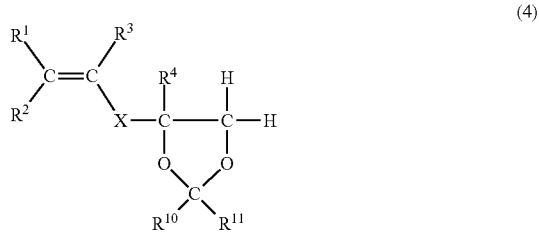

(In the formula (4), $R^1$ to $R^4$ each independently represent a hydrogen atom or an alkyl group having 1 to 4 carbon atoms, X represents a single bond or a bond chain, and $R^{10}$ and $R^{11}$ each independently represent a hydrogen atom or an alkyl group having 1 to 4 carbon atoms.)

Specific examples and preferred examples of $R^1$ to $R^4$ and X in the formula (2) to the formula (4) are the same as those of the formula (1) above, and specific examples and preferred examples of the alkyl group having 1 to 4 carbon atoms of $R^7$ to $R^{11}$ are the same as those in the formula (1).

Among the above methods, the method (i) is preferred in that copolymerization reactivity and industrial handling are excellent. In particular, as the compound represented by the general formula (2), it is preferable to use 3,4-diacyloxy-1-butene in which $R^1$ to $R^4$ are hydrogen atoms, X is a single bond, $R^7$ and $R^8$ are $R^9$—CO—, and $R^9$ is an alkyl group having 1 to 4 carbon atoms. Among these, 3,4-diacetoxy-1-butene, in which $R^9$ is a methyl group, is particularly preferably used.

Examples of the post-modified PVA-based resin obtained by introducing functional groups by the post reaction include those having an acetoacetyl group by a reaction with diketene, those having a polyalkylene oxide group by a reaction with ethylene oxide, those having a hydroxyalkyl group by a reaction with an epoxy compound or the like, or those obtained by reacting an aldehyde compound having various functional groups with a PVA-based resin.

As the PVA-based resin, resins having different properties such as degree of saponification, viscosity average polymerization degree, melting point, type of functional group, modification rate, crosslinking degree, crystallinity, and solubility may be used in combination.

In the present invention, the particle group A and the particle group B are preferably contained such that a mass ratio of the particle group A to the particle group B is 10:90 to 70:30. When a content ratio of the particle group A and the particle group B is within the above range, the particle group C is likely to clog the gap formed by the particle group A and the particle group B, and the filling property to the target gap can be enhanced. The content ratio of the particle group A to the particle group B is more preferably 20:80 to 65:35.

In addition, in the particle group C, it is preferable to use particles having low solubility in water from the viewpoint of efficiently filling the target gap and forming a close-filled structure. For example, it is preferable to use an unmodified PVA-based resin, a polylactic acid-based resin, sand, or the like.

Additives (agents) other than the above-described materials may be added to the diverting agent according to the present invention within a range that does not inhibit the effects of the present invention. Examples of the other additives (agents) include ceramics, raffs, wood pieces, seed shells, and the like.

A blending amount of the additive (agent) is preferably 50 mass % or less, more preferably 30 mass % or less, and still more preferably 10 mass % or less with respect to the entire diverting agent.

In the diverting agent according to the present invention, it is preferable that when 24 g of the diverting agent is added to 400 mL of a 0.60 mass % aqueous solution of guar gum and dispersed at 23° C. for 60 minutes to obtain a dispersion liquid having a diverting agent concentration of 6 mass %, the dispersion liquid is subjected to pressure dehydration at pressure of 0.4 MPa using a pressure dehydration device including a drainage portion having a slit having a width of 2 mm, an cumulative dehydration amount y with respect to a square root x of a time is obtained, and a regression line represented by the following formula (A) is calculated by a least-squares method from a scatter diagram plotted on a graph in which the square root x of the time is plotted on a horizontal axis and the cumulative dehydration amount y is plotted on a vertical axis, a water permeability coefficient represented by a slope a of the following formula (A) is in a range of 0.0 to 4.0.

$$y = ax + b \quad (A)$$

(In the formula (A), y is the cumulative dehydration amount (g), x is the square root of the time (minutes) elapsed from start of pressurization, a and b are the slope and an intercept of a regression line, and $0 < x \leq 2$).

Examples of the pressure dehydration device include "HPHT Filter Press 500CT" (trade name) manufactured by Fann Instrument Company.

In the above formula (A), x is the square root of the time (minutes) elapsed from the start of pressurization, and y is the cumulative dehydration amount (g). a and b are the slope and the intercept of the regression line. The slope a represents a water permeability coefficient. The water permeability coefficient represents ease of flow of water in the diverting agent dispersion liquid. The intercept b is a variable determined by the slope a, and is a value serving as a guide of the dehydration amount at 0 minute at the start of pressurization.

When the water permeability coefficient a is in the range of 0.0 to 4.0, it can be said that the filling property with respect to the target gap is high. The water permeability coefficient is more preferably in the range of 0.0 to 3.0, and still more preferably in the range of 0.0 to 2.0.

When petroleum, natural gas, or the like is excavated in a hydraulic fracturing method, the diverting agent of the present invention can enter fractures or fissures formed in the well, and then temporarily fill the fractures or fissures, so that new fractures or fissures can be formed. As a method for filling the fractures or fissures, the diverting agent of the present invention is allowed to flow into the fracture to be filled with a flow of fluid in the well.

In addition, 10 mass % or more of the diverting agent of the present invention is a biodegradable resin, and the biodegradable resin is rapidly dissolved in water and removed after use and is then biodegraded. Therefore, the environmental load is small and the diverting agent is very useful.

EXAMPLES

Hereinafter, the present invention will be described more specifically with reference to Examples and Comparative Examples, but the present invention is not limited to these Examples. In the following Examples and Comparative Examples, "parts" and "%" are based on mass unless otherwise specified.

Polyvinyl alcohol (PVA)-based resin particles (PVA1 to PVA5) were produced according to the following Production Examples.

Production Example 1: Production of Cylindrical PVA-Based Resin Particles (PVA1)

1. Production of Powdery PVA-Based Resin

To a reaction can equipped with a reflux condenser, a dropping device and a stirrer, 20 parts of vinyl acetate (20% of the total was used for initial charge), 32.5 parts of methanol, and 0.8 parts of 3,4-diacetoxy-1-butene (20% of the total was used for initial charge) were charged, the temperature was raised under a nitrogen stream while stirring. After reaching the boiling point, 0.093 parts of acetyl peroxide was charged, and polymerization was started.

After 0.4 hour from the start of polymerization, 80 parts of vinyl acetate and 3.2 parts of 3,4-diacetoxy-1-butene were dropped at a constant speed over 11 hours. When a polymerization rate of vinyl acetate became 91%, a predetermined amount of m-dinitrobenzene was added to complete the polymerization. Then, unreacted vinyl acetate monomer was removed out of the system through distillation while blowing methanol vapor, and a methanol solution of the copolymer was thus obtained.

Then, the solution was diluted with methanol, and adjusted to have a solid content concentration of 55%, and saponification was performed by adding a methanol solution of 2% sodium hydroxide (in terms of sodium) at a ratio of 12 mmol with respect to 1 mol of the total amount of the vinyl acetate structural units and the 3,4-diacetoxy-1-butene structural unit in the copolymer while maintaining the solution temperature at 45° C. As the saponification proceeded, a saponified product was precipitated, and when the form of the precipitated saponified product was turned into a cake shape, the cake was pulverized. Thereafter, acetic acid for neutralization was added in an amount of 0.3 equivalent per 1 equivalent of sodium hydroxide, followed by filtration, thoroughly washing with methanol, and drying in a hot air dryer to obtain a powdery side-chain 1,2-diol structural unit-containing modified PVA.

The degree of saponification of the obtained side-chain 1,2-diol structural unit-containing modified PVA, which was analyzed with an amount of alkali consumption required for hydrolysis of the structural units of the remaining vinyl acetate and 3,4-diacetoxy-1-butene in the resin, was 99.0 mol %. The viscosity average polymerization degree, which was analyzed in accordance with JIS K6726, was 530.

The content (modification amount) of the 1,2-diol structural unit represented by the formula (1) in the side-chain 1,2-diol structural unit-containing modified PVA, which was calculated based on an integrated value measured by $^1$H-NMR (300 MHz proton NMR, a $d_6$-DMSO solution, internal standard substance: tetramethylsilane, 50° C.), was 2 mol %.

2. Production of Cylindrical PVA-Based Resin

The side-chain 1,2-diol structural unit-containing modified PVA obtained above and magnesium stearate and magnesium 12-hydroxystearate were charged into an extruder so as to be 500 ppm of each with respect to the PVA, respectively, melt-kneaded under the following conditions, extruded, air-cooled and solidified, and then cut using a cutter (strand cutting style). Thereafter, drying was performed to obtain cylindrical PVA-based resin particles (PVA1) having a diameter of 2.6 mm and an axial length of 3 mm.

(Melt-Kneading Conditions)

Extruder: manufactured by Technovel Corporation, 15 mmφ, L/D=60

Rotation speed: 200 rpm

Discharge amount: 1.2 to 1.5 kg/h

Extrusion temperature (° C.): C1/C2/C3/C4/C5/C6/C7/C8/D=90/170/200/215/215/220/225/225/225

Production Example 2: Production of Powdery PVA-Based Resin Particles (PVA2)

In "1. Production of Powdery PVA-Based Resin" in Production Example 1 above, vinyl acetate was changed to 100 parts, methanol was changed to 32.5 parts, and 3,4-diacetoxy-1-butene was changed to 2 parts, thereby obtaining a powdery side-chain 1,2-diol structural unit-containing modified PVA (PVA2). The obtained side-chain 1,2-diol structural unit-containing modified PVA (PVA2) was spherical particles having an average particle diameter of 745 μm.

The degree of saponification of the side-chain 1,2-diol structural unit-containing modified PVA (PVA2), which was analyzed with an amount of alkali consumption required for hydrolysis of the structural units of the remaining vinyl acetate and 3,4-diacetoxy-1-butene in the resin, was 99.0 mol %. The viscosity average polymerization degree, which was analyzed in accordance with JIS K6726, was 450.

The content (modification amount) of the 1,2-diol structural unit represented by the formula (1) in the side-chain 1,2-diol structural unit-containing modified PVA (PVA2), which was calculated based on an integrated value measured by $^1$H-NMR (300 MHz proton NMR, a $d_6$-DMSO solution, internal standard substance: tetramethylsilane, 50° C.), was 1 mol %.

Production Example 3: Production of Powdery PVA-Based Resin Particles (PVA3)

The PVA-based resin particles (PVA2) obtained in Production Example 2 were dry-sieved for 30 minutes by a stainless steel electric sieve having a sieve size of 250 μm to collect only fine powder having a particle diameter of less than 250 μm, thereby obtaining a side-chain 1,2-diol structural unit-containing modified PVA (PVA3). The obtained side-chain 1,2-diol structural unit-containing modified PVA (PVA3) was spherical particles having an average particle diameter of 201 μm.

Production Example 4: Production of Powdery PVA-Based Resin Particles (PVA4)

In "1. Production of Powdery PVA-Based Resin" in Production Example 1 above, vinyl acetate was changed to 100 parts, methanol was changed to 18 parts, and 3,4-diacetoxy-1-butene was changed to 3 parts, and the polymerization was completed when the polymerization rate became 96% to obtain a powdery side-chain 1,2-diol structural unit-containing modified PVA (PVA4). The obtained side-chain 1,2-diol structural unit-containing modified PVA (PVA4) was spherical particles having an average particle diameter of 1,113 μm.

The degree of saponification of the side-chain 1,2-diol structural unit-containing modified PVA (PVA4), which was analyzed with an amount of alkali consumption required for hydrolysis of the structural units of the remaining vinyl acetate and 3,4-diacetoxy-1-butene in the resin, was 99.3 mol %. The viscosity average polymerization degree, which was analyzed in accordance with JIS K6726, was 600.

The content (modification amount) of the 1,2-diol structural unit represented by the formula (1) in the side-chain 1,2-diol structural unit-containing modified PVA (PVA4), which was calculated based on an integrated value measured by $^1$H-NMR (300 MHz proton NMR, a $d_6$-DMSO solution, internal standard substance: tetramethylsilane, 50° C.), was 1.5 mol %.

Production Example 5: Production of Powdery PVA-Based Resin Particles (PVA5)

To a reaction can equipped with a reflux condenser, a dropping device and a stirrer, 20 parts of vinyl acetate (20% of the total was used for initial charge) and 34.5 parts of methanol were charged, and the temperature was raised under a nitrogen stream while stirring. After reaching the boiling point, 0.068 parts of acetyl peroxide was charged, and polymerization was started.

After 0.4 hour from the start of polymerization, 80 parts of vinyl acetate were dropped at a constant speed over 9.5 hours. When the polymerization rate of vinyl acetate became 89%, a predetermined amount of hydroquinone monomethyl ether was added to complete the polymerization. Then, unreacted vinyl acetate monomer was removed out of the system through distillation while blowing methanol vapor, and a methanol solution of the vinyl acetate copolymer was thus obtained.

Then, the solution was diluted with methanol, the solid content concentration was adjusted to 50%, and the methanol solution was charged into a kneader. Saponification was performed by adding a methanol solution of 2% sodium hydroxide (in terms of sodium) at a ratio of 4.8 mmol with respect to 1 mol of the vinyl acetate structural unit while maintaining the solution temperature at 35° C. When the saponified product precipitated in particles as the saponification proceeded, the methanol solution of 2% sodium hydroxide (in terms of sodium) was further added at a ratio of 7.5 mmol with respect to 1 mol of the vinyl acetate structural unit, thereby performing the saponification. Thereafter, acetic acid for neutralization was added in an amount of 0.8 equivalents of sodium hydroxide, a powdery unmodified PVA (PVA5) were obtained by filtering, washing well with methanol and drying in a hot air drier. The obtained unmodified PVA (PVA5) was spherical particles having an average particle diameter of 612 μm.

The degree of saponification of the unmodified PVA (PVA5), which was analyzed with the amount of alkali consumption required for hydrolysis of the structural units of the remaining vinyl acetate in the resin, was 98.9 mol %. The viscosity average polymerization degree, which was analyzed in accordance with JIS K6726, was 500.

The degree of saponification, the viscosity average polymerization degree, the modification species, and modification degree of PVA1 to PVA5 obtained in Production Examples 1 to 5 are summarized in Table 1.

TABLE 1

| | Appearance | Average Particle Diameter (μm) | Degree of Saponification (mol %) | Viscosity Average Polymerization Degree | Modification Species | Modification Degree (mol %) |
|---|---|---|---|---|---|---|
| PVA1 | Cylindrical Pellet | Diameter of 2.6 mm, Axial Length of 3 mm | 99.0 | 530 | 1,2-diol | 2 |
| PVA2 | Powdery | 745 | 99.0 | 450 | 1,2-diol | 1 |
| PVA3 | Powdery | 201 | 99.0 | 450 | 1,2-diol | 1 |
| PVA4 | Powdery | 1113 | 99.3 | 600 | 1,2-diol | 1.5 |
| PVA5 | Powdery | 612 | 98.9 | 500 | Unmodified | — |

In addition, the following polylactic acid and sand were prepared.

Polylactic acid (PLA): Polylactic acid of less than 250 μm was extracted from polylactic acid manufactured by Nature Works Corporation, by dry sieving.

Sand: An inorganic mineral used as Proppant obtained from the United States of America was sieved with a 40/80 mesh and one passed through the mesh was used. A particle shape was a mixture of a spherical shape and a polygonal shape.

Example 1

PVA1, PVA2, and PVA3 were uniformly mixed at a ratio of 30.0%, 59.2%, and 10.8%, respectively, to prepare a particle mixture.

Example 2

PVA1, PVA2, and PVA3 were uniformly mixed at a ratio of 30.0%, 51.8%, and 18.2%, respectively, to prepare a particle mixture.

Example 3

PVA1, PVA2, and PVA3 were uniformly mixed at a ratio of 20.0%, 59.2%, and 20.8%, respectively, to prepare a particle mixture.

Example 4

PVA1, PVA2, and PLA were uniformly mixed at a ratio of 30.0%, 51.8%, and 18.2%, respectively, to prepare a particle mixture.

Example 5

PVA1, PVA2, and sand were uniformly mixed at a ratio of 30.0%, 51.8%, and 18.2%, respectively, to prepare a particle mixture.

Example 6

PVA1, PVA2, and PVA5 were uniformly mixed at a ratio of 20.0%, 59.2%, and 20.8%, respectively, to prepare a particle mixture.

Example 7

PVA1, PVA2, and PVA5 were uniformly mixed at a ratio of 30.0%, 51.8%, and 18.2%, respectively, to prepare a particle mixture.

Example 8

PVA1, PVA2, and PVA5 were uniformly mixed at a ratio of 50.0%, 37.0%, and 13.0%, respectively, to prepare a particle mixture.

Example 9

PVA1, PVA4, and PLA were uniformly mixed at a ratio of 30.0%, 50.3%, and 19.7%, respectively, to prepare a particle mixture.

Comparative Example 1

PVA1 and PVA2 were uniformly mixed at a ratio of 30.0% and 70.0%, respectively, to prepare a particle mixture.

Comparative Example 2

PVA1 and PVA4 were uniformly mixed at a ratio of 30.0% and 70.0%, respectively, to prepare a particle mixture.

<Configuration of Particle Mixture: Content Ratio (%) for Each Particle Diameter>

The particle diameter of the particle mixture prepared in each example was measured by a dry sieving test method, and the content ratio of particles having a particle diameter of 1,700 μm or more, particles having a particle diameter of 500 μm or more and less than 1,700 μm, and particles having a particle diameter of less than 250 μm was measured. Measurement results are shown in Table 2.

<Measurement of Water Permeability Coefficient>

24 g of the particle mixture in each Example was added to 400 mL of a 0.60 mass % aqueous solution of guar gum, and the mixture was stirred and dispersed at 23° C. for 60 minutes to obtain a dispersion liquid having a particle mixture concentration of 6 mass %. The obtained dispersion liquid was subjected to pressure dehydration at pressure of 0.4 MPa using a pressure dehydration device ("HPHT Filter Press 500CT" (trade name) manufactured by Fann Instruments Corporation) equipped with a drainage portion having a slit having a width of 2 mm, and the dehydration amount after 30 seconds and the dehydration amount over each minute were recorded. The cumulative dehydration amount y with respect to the square root x of the time was obtained based on the obtained dehydration amount, and a regression line represented by the following formula (A) was calculated by a least squares method from a scatter diagram plotted on a graph in which the square root x of the time was plotted on the horizontal axis and the cumulative dehydration amount y was plotted on the vertical axis.

$$y = ax + b \quad (A)$$

(In the formula (A), y is the cumulative dehydration amount (g), x is the square root of the time (minutes) elapsed from start of pressurization, a and b are the slope and an intercept of a regression line, and 0<x≤2).

From the obtained regression line, the water permeability coefficient was obtained as the slope a of the formula (A). Results are shown in Table 2.

TABLE 2

|  | Combination of Particle Mixture | | | Content of Biodegradable Resin (mass %) | Content Ratio for Each Particle Diameter (mass %) | | | Water Permeability Coefficient |
|---|---|---|---|---|---|---|---|---|
|  |  |  |  |  | 1,700 μm or more | 500 μm or more, less than 1,700 μm | Less than 250 μm |  |
| Example 1 | PVA1 | PVA2 | PVA3 | 100 | 30.0 | 47.3 | 14.0 | 0.8 |
| Example 2 | PVA1 | PVA2 | PVA3 | 100 | 30.0 | 41.4 | 21.0 | 0.8 |
| Example 3 | PVA1 | PVA2 | PVA3 | 100 | 20.0 | 47.3 | 24.0 | 0.9 |

TABLE 2-continued

|  | Combination of Particle Mixture | | | Content of Biodegradable Resin (mass %) | Content Ratio for Each Particle Diameter (mass %) | | | Water Permeability Coefficient |
|---|---|---|---|---|---|---|---|---|
|  |  |  |  |  | 1,700 μm or more | 500 μm or more, less than 1,700 μm | Less than 250 μm |  |
| Example 4 | PVA1 | PVA2 | PLA | 100 | 30.0 | 41.4 | 21.0 | 0.0 |
| Example 5 | PVA1 | PVA2 | Sand | 81.8 | 30.0 | 41.5 | 8.2 | 0.9 |
| Example 6 | PVA1 | PVA2 | PVA5 | 100 | 20.0 | 47.3 | 24.0 | 0.7 |
| Example 7 | PVA1 | PVA2 | PVA5 | 100 | 30.0 | 41.4 | 21.0 | 0.9 |
| Example 8 | PVA1 | PVA2 | PVA5 | 100 | 50.0 | 29.6 | 15.0 | 0.6 |
| Example 9 | PVA1 | PVA4 | PLA | 100 | 33.0 | 40.2 | 20.1 | 0.9 |
| Comparative Example 1 | PVA1 | PVA2 | — | 100 | 30.0 | 55.9 | 3.8 | 4.5 |
| Comparative Example 2 | PVA1 | PVA4 | — | 100 | 34.2 | 56.0 | 0.5 | 21.0 |

From the results in Table 2, it was found that Examples 1 to 9 had a smaller water permeability coefficient than Comparative Examples 1 and 2, and had an excellent primary filling effect.

Although the present invention has been described in detail with reference to specific embodiments, it will be apparent to those skilled in the art that various changes and modifications can be made without departing from the spirit and scope of the present invention. This application is based on a Japanese Patent Application (Japanese Patent Application No. 2019-124756) filed on Jul. 3, 2019, the contents of which are incorporated herein by reference.

The invention claimed is:

1. A diverting agent comprising:
particles having an average particle diameter of 1,700 μm or more in an amount of 10 to 70 mass % relating to the total mass of the diverting agent;
particles having an average particle diameter of 500 μm or more and less than 1,700 μm in an amount of 20 to 80 mass % relating to the total mass of the diverting agent; and
particles having an average particle of less than 250 μm in an amount of 5 to 40 mass % relating to the total mass of the diverting agent,
wherein 10 mass % or more of the diverting agent relating to the total mass of the diverting agent is a biodegradable resin.

2. The diverting agent according to claim 1,
wherein when 24 g of the diverting agent is added to 400 mL of a 0.60 mass % aqueous solution of guar gum and dispersed at 23° C. for 60 minutes to obtain a dispersion liquid having a diverting agent concentration of 6 mass %, the dispersion liquid is subjected to pressure dehydration at pressure of 0.4 MPa using a pressure dehydration device including a drainage portion having a slit having a width of 2 mm, an cumulative dehydration amount y with respect to a square root x of a time is obtained, and a regression line represented by the following formula (A) is calculated by a least-squares method from a scatter diagram plotted on a graph in which the square root x of the time is plotted on a horizontal axis and the cumulative dehydration amount y is plotted on a vertical axis, a water permeability coefficient represented by the slope a of the following formula (A) is in a range of 0.0 to 4.0, $$y = ax + b \quad (A)$$

in the formula (A), y is a cumulative dehydration amount (gram), x is the square root of the time (minutes) elapsed from start of pressurization, a and b are the slope and an intercept of the regression line, and $0 < x \leq 2$.

3. The diverting agent according to claim 1,
wherein the biodegradable resin contains a polyvinyl alcohol-based resin.

4. The diverting agent according to claim 3,
wherein the polyvinyl alcohol-based resin has a degree of saponification of 90 mol % or more.

5. The diverting agent according to claim 3,
wherein the polyvinyl alcohol-based resin is a polyvinyl alcohol-based resin having a primary hydroxyl group in a side chain.

6. A method of temporarily filling a fracture generated in a well, the method comprising:
allowing the diverting agent according to claim 1 to flow into a fracture to be filled with a flow of a fluid in the well.

* * * * *